Sept. 29, 1931.  F. W. PEEK, JR  1,825,541
MEANS FOR PROTECTING ELECTRICAL APPARATUS
Filed Aug. 1, 1927
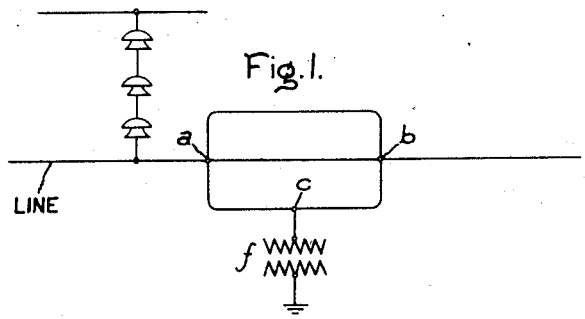
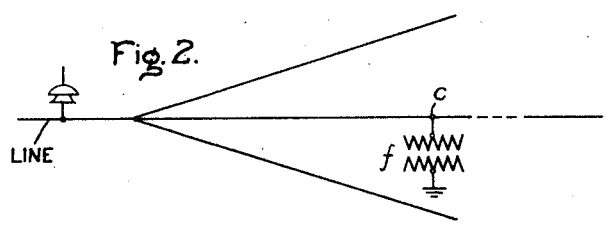
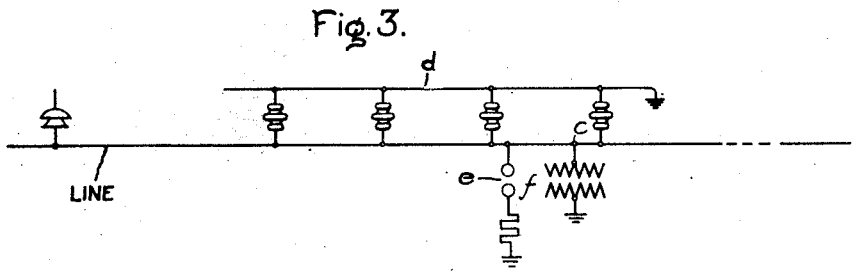
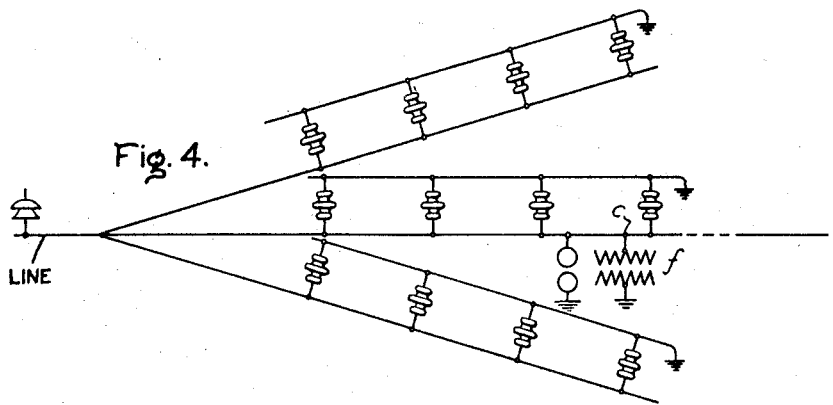
Inventor:
Frank W. Peek, Jr.
by
His Attorney.

Patented Sept. 29, 1931

1,825,541

UNITED STATES PATENT OFFICE

FRANK W. PEEK, JR., OF PITTSFIELD, MASSACHUSETTS, ASSIGNOR TO GENERAL ELECTRIC COMPANY, A CORPORATION OF NEW YORK

MEANS FOR PROTECTING ELECTRICAL APPARATUS

Application filed August 1, 1927. Serial No. 209,762.

My invention relates to means for protecting electrical apparatus such as transformers and the like.

Heretofore electrical apparatus connected with a line which terminates in a source of current supply has been protected against the effect of transient abnormal voltages such as arise due to lightning, switching, and the like, by means of lightning arresters and by means of energy-absorbing devices of various sorts. It is an object of my invention to protect such apparatus by a novel means. If a transmission line, for example, is divided into several branches, an abnormally high voltage transient wave traveling along the line will divide along the various branches because of the division of electric energy among the several branches. As a result, the voltage on each branch will be less than the voltage in the main line. It is an object of my invention to make use of this principle in the protection of transformers and other electrical apparatus by connecting the apparatus to one of the branches.

The maximum lightning voltage on a transmission line is generally determined by the lightning arc-over voltage of the line insulation, such as that represented by the insulators. It is generally undesirable to subject the apparatus to these voltages. A gap could be placed across the apparatus and set to spark-over at a voltage lower than the spark-over voltage of the line insulators. This would decrease the reliability of the system by causing more flash-overs at this point. I propose, as another method of protecting the electrical apparatus, to set the gap at a low enough voltage to protect the apparatus and at the same time I change the surge impedance of the line near the apparatus so that any abnormally high surge or transient voltage on the line is reduced to very slightly below the gap set. This in effect is equivalent to making the spark-over voltage of the gap approximately equal to the spark-over voltage of the line insulators without reducing the protecting value of the gap. In other words, the spark-over voltage of the line insulators will be reduced slightly below the gap spark-over voltage before the line reaches the gap. The only time the gap would spark-over and would be called upon to protect the line would be in case of a direct stroke near the station. I do not wish, however, to limit myself to the way in which the surge impedance is reduced to accomplish this result.

The means for accomplishing the foregoing results are hereinafter more fully set forth and claimed, reference being had to the accompanying drawings, in which the various figures, 1, 2, 3 and 4, show modified forms of arrangements for carrying out the invention.

Fig. 1 shows a line with three branches. As indicated in this figure, an electric device, such as a transformer in this instance, is shown connected to one of the branches. In this figure the branches radiate from a common point at the left and meet again at a common point at the right.

Fig. 2 is a modification of the invention shown in Fig. 1. In Fig. 2 there are also shown a number of branches radiating from a common point. These branches do not again converge and meet at a second point as in Fig. 1. The branches are left open. While the branches are shown radiating, they may extend parallel.

Fig. 3 is a modified form of the invention. In this case a ground wire is substituted for a branching line.

Fig. 4 shows a modified form of the invention. In this case both the branching lines and the ground line arrangement are used, a ground line being shown associated with each branch line.

Referring more in detail to the drawings, it will be seen that in Fig. 1 the line is split and the electric device which is to draw current from the line is shown legged off to ground from one of the branches that radiate from the line from the points $a$ and $b$. With this arrangement the surge voltage of the branch to which the electric device is connected is reduced. With this arrangement the region of the line to which the device is connected is shielded from the surge voltage to the extent that the surge voltage is prevented from rising within such region to a value dangerous to the device. Under the circumstances, therefore, the surge impedance of the line within the region of the point $c$ to which the electric device $f$ is connected is sufficiently low to prevent a rise of potential within this region as a result of the surge, which would be dangerous to the device. It will be understood that the surge impedance in any of the branches between the points $a$ and $b$ may be as high as the surge impedance of the main line. Nevertheless, inasmuch as the surge divides at the point $a$ proportionately the surge voltage in any of the branches will be lower than the surge voltage of the main line. Therefore, even under the circumstance that the surge impedance of each branch be equal to the surge impedance of the line the surge voltage in any one of the branches will be lower than the surge voltage of the main line. With the arrangement shown in Fig. 1, the surge divides at the point $a$ and advances along the three branches and unites again at the point $b$, assuming of course that it is traveling from left to right. Inasmuch as the surge divides, its potential along each of the branches is much lower than the original potential. With the arrangement shown in Fig. 2 the surge divides in the same way at the point $a$ along the three branches. The surge along the central branch continues on, but the surge along the upper and lower branches is reflected and returns again in due course to the point $a$. Obviously, therefore, the surge potential is lowered along the central branch thereby reducing the strain on the electric device $f$.

In Fig. 3 the same result is obtained by providing a ground wire $d$ in proximity to the line. In this figure the line wire is shown separated from the ground wire $d$ by means of insulators, four of which are shown. It will be understood that the surge impedance of the line is affected by this ground wire $d$. The effect of extending the ground wire $d$ along the line wire is to reduce the surge impedance of the line in the region covered by the ground wire. In this figure the electric device is shown protected by an arrester $e$, the gap of which is set at a voltage sufficiently low to protect the device against the reduced surge voltage along the region of the point $c$ to which the electric device $f$ is connected. It will be understood that a lightning arrester can be used in connection with any of the arrangements shown in the drawings in the manner shown in Fig. 3.

In Fig. 4, it will be seen, I have combined in one arrangement the arrangements of Figs. 2 and 3. It will be understood that in each of the figures the electric device $f$ is represented as a transformer, although any other electric device might be substituted for the transformer. In Fig. 4 the line branches are separated from the ground branches by insulators in the same manner as indicated in Fig. 3.

In constructing the branches or the ground wire in connection with my invention, regard must be had to the average length of charged clouds in the region of the line and which produce surges of the kind described therein as for example when a lightning discharge takes place, and against which protection is desired. Ordinarily the length of the branches should be in the neighborhood of a mile. If the average charged cloud should exceed this length, the length of the branch should be increased accordingly.

It will be understood that while I have described my invention in connection with a specific form of construction, I do not wish to be so limited inasmuch as, in view of the disclosure, variations will readily suggest themselves falling within the spirit of the invention and the scope of the claims contained herein.

What I claim as new and desire to secure by Letters Patent of the United States, is:

1. In an electric system, a line and a line insulator for supporting the line, said insulator having a given spark-over voltage, an electric apparatus connected with the line, a discharge gap located in shunt of said apparatus, the gap being set to spark-over at a voltage below the spark-over voltage of the insulator, and conductive means insulated from the line and extending along the region of the line to which the electric apparatus and the gap are connected for decreasing the surge impedance of the line at the point where the gap is connected to the line to a value below that of other parts of the line whereby a surge is prevented from maintaining its original voltage of the insulator region when it reaches the spark gap.

2. In an electric transmission system, a main line for conveying electric energy at a normal operating voltage, said line being adapted to receive surges of excessive voltage, an electric apparatus connected between said line and ground, means for shielding the region of the line to which the electric apparatus is connected from the full value of the surge voltage, said means comprising a plurality of branch lines of substantial lengths extending from said main line, said electric apparatus being connected between one of the said line branches and ground, and a lightning arrester connected between the same branch and ground in proximity to said apparatus for protecting said apparatus against the reduced voltage of the surge in said branch, said arrester having a spark gap shunting said apparatus, the spark-over setting of the gap being for a voltage lower than the arc-over voltage of the insulation between the main line and ground.

3. In an electric transmission system, a main line for conveying electric energy at a normal operating voltage, said line being adapted to receive surges of excessive voltage, an electric apparatus between said line and ground, means for shielding the region of the line to which the electric apparatus is connected from the full voltage of a surge on said line, said means including branch lines of substantial lengths extending from said main line, whereby the voltage of an abnormal transient wave traveling along the main line is reduced before reaching said apparatus, and a grounded conductor near said main line in the region of said apparatus to decrease the surge impedance of the main line in said region to a value smaller than that of other parts thereof.

4. In an electric transmission system, a line insulated from ground for a given arc-over voltage, an electric apparatus connected between the line and ground, a discharge gap connected in shunt of said apparatus and having a spark-over voltage below said arc-over voltage of the line, and means for decreasing the surge impedance of the line in the region of said apparatus and gap to a value smaller than that of other parts of said line, whereby the voltage of an abnormal transient wave traveling along the line is reduced before reaching said apparatus and gap.

5. In an electric transmission system, a main line insulated from ground for a given arc-over voltage, an electric apparatus connected between the line and ground, a discharge gap connected in shunt of said apparatus and having a spark-over voltage below said arc-over voltage of the line, means for decreasing the surge impedance of the line in the region of said apparatus and gap to a value smaller than that of other parts of said line, and branch lines of substantial lengths extending from said main line, whereby the voltage of an abnormal transient wave traveling along the main line is reduced before reaching said apparatus and gap.

In witness whereof I have hereunto set my hand this 28th day of July, 1927.

FRANK W. PEEK, Jr.